June 13, 1939.  E. L. DAVIS  2,162,002
WINDSHIELD WIPER CASING CLAMP
Filed Oct. 12, 1936
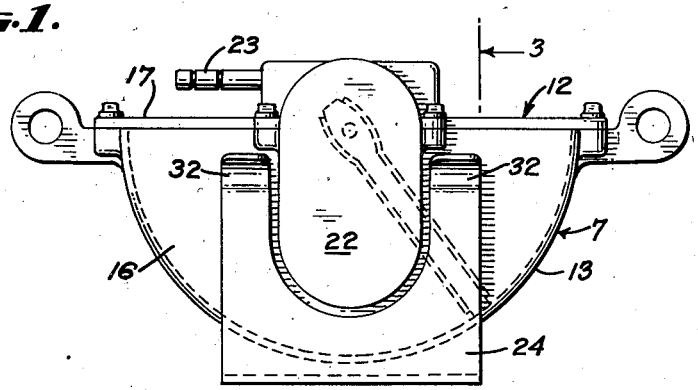
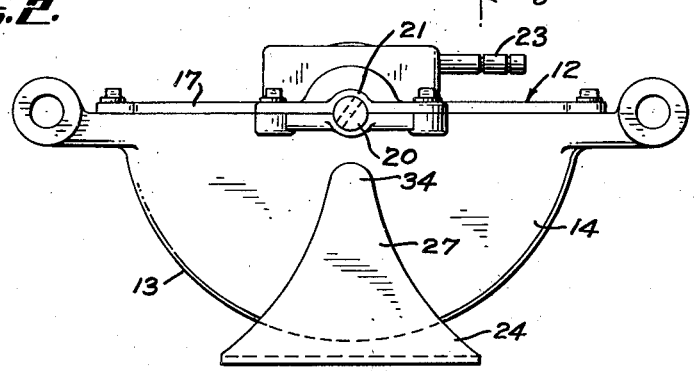
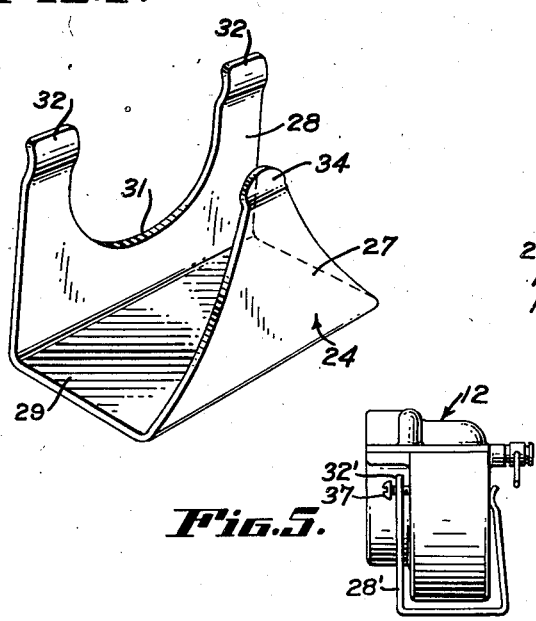
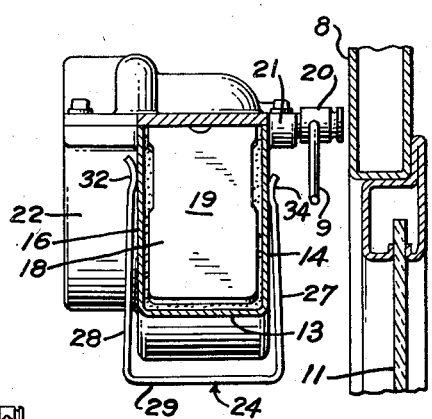
INVENTOR.
ELLWOOD L. DAVIS
BY Joseph B. Gardner
ATTORNEYS.

Patented June 13, 1939

2,162,002

UNITED STATES PATENT OFFICE 2,162,002

WINDSHIELD WIPER CASING CLAMP

Ellwood L. Davis, Oakland, Calif.

Application October 12, 1936, Serial No. 105,296

6 Claims. (Cl. 121—1)

The invention relates to wind-shield wipers such as those used for automobiles and the like, and being adapted for operation from the intake manifold of an automobile engine, and more particularly to the construction of a vacuum motor casing of such wind-shield wipers.

At present, the vacuum motor units used for operating a wind-shield wiper for the automobiles and the like are constructed of a casing providing a motor cylinder and in which is mounted a movable vane having the sides of the vane engaged with certain sides of the casing. Also, embodied in the casing is a series of air passages and valve mechanisms which operate to communicate the opposite sides of the motor chamber alternately with a source of vacuum so as to produce an oscillation of the vane and of the wind-shield wiper driven thereby. Due to the particular construction of such a casing with the various passages and valves and the like, it has been most feasible to die-cast the casing parts and accordingly the selection of the material used in the unit has been limited to that suitable for die-casting purposes. Such material is of a relatively soft character and even though the walls of the casing be made of considerable thickness, the strain on the casing by the operation of the motor is such as to cause a swelling of the casing walls and an opening of the normally sealed engagement of the movable vane with such walls. Then too, the vane itself is subject to certain wear and due to the combination of the reduction of the size of the vane and increase in the size of the motor chamber, the motor unit after a period of use loses its efficiency and may become substantially inoperable.

In accordance with the present invention and as a principal object thereof, I use in conjunction with a vacuum motor casing formed of suitable die-casting material, as above mentioned, a re-enforcing member made of sturdier and more resilient material such as steel which will function to constantly maintain the walls of the vacuum motor casing in proper engagement with the movable vane carried therein.

Another object of the invention is to provide a re-enforcing means of the character above, which may be constructed as a separate clamp member which may at any time be simply and readily placed on the exterior of the vacuum motor casing and will, regardless of the normal swelling of such casing, cause a restoration of the casing walls to original or even a slightly inwardly displaced position so as to properly engage the movable vane in the casing and thus restore the operating efficiency of the unit which may have through wear become otherwise substantially useless.

A further object of the invention is to provide a clamp of the above character which will be formed to correctly engage the principal walls of the vacuum motor casing and conform to the irregularities in the form of the casing by reason of the incorporation therein of certain valve mechanisms and the like.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

Figure 1 is a rear elevation of a vacuum motor unit for a wind-shield wiper or the like with a means constructed in accordance with the present invention applied thereto.

Figure 2 is a front elevation of the unit shown in Figure 1.

Figure 3 is a transverse sectional view of the unit and is taken substantially on the plane of line 3—3 of Figure 1.

Figure 4 is a perspective view of the clamp means of the present invention.

Figure 5 is an end elevation of a modified form of the invention.

The means of the present invention, and as illustrated in the accompanying drawing, is adapted for use in conjunction with the vacuum motor unit 7 of an automobile wind-shield wiper of the type adapted to be driven by a source of reduced pressure at the intake manifold of the engine of an automobile. The unit, as illustrated in Figure 3, may be mounted at the exterior of the wind-shield frame 8 of the vehicle and is connected to a wiper element 9 adapted for movement over the outer surface of the wind-shield 11 of the vehicle. More specifically the unit comprises a generally semi-cylindrical motor casing 12 having a circumferential and axially extending side 13 and front and back sides 14 and 16 and a separate closure plate 17 extending substantially diametrically across the circumferential periphery 13 of the casing. Defined by the walls 13, 14, 16 and 17 at the interior of the casing is a semi-cylindrical motor chamber 18 in which is rotatably mounted a vane 19 having a mounting stem 20 extending into bearing portions 21 formed by the casing sides 14 and 16 and the cover plate 17 and at substantially the axis of curvature of the peripheral side 13 of the casing. In the present arrangement the wiper element 9 is connected directly to the vane stem 20. Provided on the vane along the sides thereof opposite the casing walls 13, 14, and 16, are sealing gaskets which serve to divide the motor chamber 18 into substantially two parts sealed from each other by the movable vane. A valve assembly 22 is carried by the wall 16 of the casing and co-operates, with a conduit 23 arranged for connection with a source of vacuum and with a plurality of passages formed in the casing, to alternately communicate the motor chamber at the opposite sides of the vane 19 with the source of reduced pressure so as to cause an oscillation of the vane within the motor chamber and a corresponding movement of the element 9.

As has been hereinabove pointed out, the relative complexity of the casing 7 substantially requires that same be formed by a die-casting operation, and accordingly the selection of materials available for making the casing is relatively limited. As a result, the general experience has been that the motor casing and particularly the walls 14, and 15 thereof have expanded slightly over a period of use of the device so as to render less effective the seal provided between the vane 19 and such side walls. Also, as above mentioned, the vane itself is also subject to a certain amount of wear which will further render the seal thereof within the motor chamber less effective. To obviate this expansion of the motor casing relative to the vane I have incorporated with the casing a re-enforcing member which is constructed of a stronger and more resilient material, such as steel, and will effectively compress the sides 14 and 16 of the casing towards the vane so as to insure an efficient sealed engagement between the sides of the vane and casing walls 14 and 16. In the preferred form of the invention, as illustrated in the accompanying drawing, the re-enforcing member is comprised of a separate removable clamp member 24 which may be placed on the casing either initially or after the unit has been in operation for some time.

As will be seen from the drawing, the clamp 24 is comprised of a substantial U-shaped member having opposed spaced sides 27 and 28 which are adapted to engage the front and rear sides 14 and 16 of the motor casing and which are connected by a common end portion 29 which is positioned opposite the circumferential side 13 of the casing when the clamp is operatively positioned thereon. Preferably the side 28 is provided with a recess or cut-away portion 31 extending from the free end of this side so as to straddle the valve casing 22 on the motor casing side 16 and, as will be seen, provision of such recess or cut-away portion leaves a pair of spaced end portions 32 at the free extremity of the side 28. On the other hand, the side 27 is preferably reduced in width in the direction of the free end 34 thereof so as to position such end at a transverse position intermediate the spaced end portions 32 on the side 28. The placement of the clamp on the motor casing is effected by springing the free ends of the clamp sides away from each other so as to engage over the sides 14 and 16 of the motor casing and to facilitate this initial springing of the clamp sides it is preferable that at least one of the free ends of the clamp sides, such as portions 32 here illustrated, be beveled outwardly from the opposed member side.

A slightly modified form of the invention has been illustrated in Figure 5 wherein an adjustment means 37 is provided on one of the clamp sides 28' to regulate the amount of force applied to the casing walls by the clamp. As here shown, this adjustment means is in the form of a pair of screws which are threaded through the spaced free end portions 32' of the member side 28'.

I claim:

1. In combination with an automobile windshield wiper having a vacuum motor consisting of a casing having a vane movable therein with the sides of the vane engaged with said casing, a clamp having opposed sides adapted for engagement with opposite sides of said casing for pressing the same in the direction of said vane.

2. In combination with an automobile windshield wiper having a vacuum motor consisting of a generally semi-cylindrical casing having a vane rotatably mounted therein and a valve casing at the side of said first casing, a resilient U-shaped clamp having opposed sides adapted for engagement with opposite sides of said casing for pressing the same in the direction of said vane, one of said clamp sides being recessed to fit around said valve casing.

3. A clamp for use with an automobile windshield wiper having a vacuum motor casing and a movable vane in said casing comprising, a member having opposed sides and opposed free ends on said sides for positioning said member on said casing with the member sides engaging against opposite sides of said casing for compressing same in the direction of said vane, the free end of one of said member sides having transversely spaced portions substantially in the plane of said side, and the free end of the other member side being arranged between said spaced end portions.

4. A reenforcing clamp for use with a vacuum motor casing of a wind-shield wiper for automobiles for compressing the sides of said casing against a movable vane carried therein comprising, a U-shaped member of flat material having opposed sides adapted to be sprung against opposite portions of said casing, one of said sides being cut away adjacent the free end thereof to define laterally spaced end portions, the other opposed side of said clamp having a free end portion reduced in width and positioned transversely intermediate said first end portion.

5. For use with an automobile type wind-shield wiper consisting of a vacuum motor casing providing a chamber between opposite side walls of said casing and a vane movably mounted in said chamber and normally engaged with said side walls, a member having opposed sides and opposed free ends on said sides for positioning said member on said casing with member sides engaging said opposite sides of said casing for compressing same, the free end of one of said member sides having transversely spaced portions substantially in the plane of said side, and the other member side being tapered towards the free end thereof to dispose said end between the spaced end portions of the opposed side.

6. A vacuum motor casing clamp for a windshield wiper for automobiles and the like comprising, a U-shaped clamp member having opposed sides adapted for mounting on said casing for compressing same, and means mounted on one of said sides for engagement with said casing and being adjustable relative to said side in the direction of the opposite member side so as to adjust the amount of compression of said casing.

ELLWOOD L. DAVIS.